Patented May 5, 1942

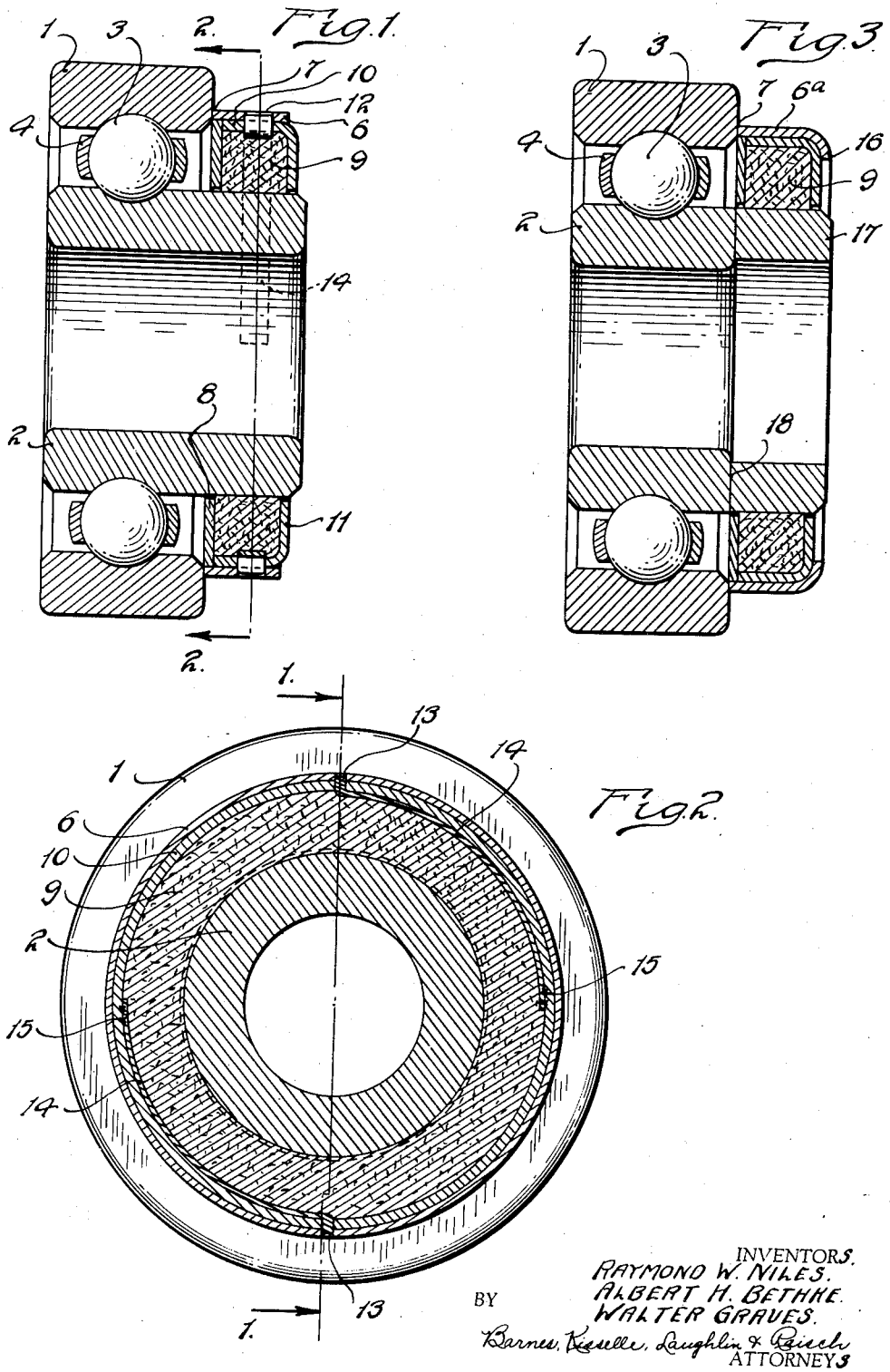

2,281,708

UNITED STATES PATENT OFFICE 2,281,708

ANTIFRICTION BEARING

Raymond Walter Niles, Saline, Albert Herman Bethke, Ann Arbor, and Walter Graves, Ypsilanti, Mich., assignors to Hoover Ball & Bearing Company, Ann Arbor, Mich., a corporation of Michigan Application October 21, 1939, Serial No. 300,520

3 Claims. (Cl. 308—187.2)

This invention relates to antifriction bearings and it has to do particularly with improvements in the provision of a bearing with auxiliary structure such as a lubricant sealing device or other device which may be attached to one or both of the races.

Heretofore, for example, lubricant seals for antifriction bearings have been associated with the bearings by means of machining one of the races with a groove or similar structure and fitting a piece therein for holding or for forming a part of the seal. This requires additional machining operations and weakens the structure of the race. This invention involves the placement of and securing of a lubricant seal to a race member of an antifriction bearing by directly uniting a holding element to a race member as by means of welding.

Devices for carrying out the invention are shown in the accompanying drawing and wherein Fig. 1 is a cross sectional view of an antifriction bearing constructed in accordance with the invention and having a lubricant seal associated therewith.

Fig. 2 is a cross sectional view taken substantially on line 2—2 of Fig. 1.

Fig. 3 is a view similar to Fig. 1 showing a modified form of lubricant seal and a modified arrangement of one of the races.

The antifriction bearing, as shown in Fig. 1, has an outer race 1 and an inner race 2 with balls 3 between the races which may be held by a ball retainer 4. Of course, antifriction bearings are made with rollers but in any event they are rolling elements and balls are one type of rolling elements.

As shown in Fig. 1 the inner race has an axial extent greater than the outer race, and a lubricant seal is associated with the extension of the inner race. The structure shown comprises a ring of thin metal or sheet metal as indicated at 6, and which ring is welded to the outer race at 7. The type of welding used is preferably electro-percussive welding where an electrical discharge of relatively high voltage and high frequency is effected while the race and ring are spaced apart, and then the two pieces are brought together with a percussive engagement. The surfaces of the metal are heated to a welding heat in the discharge so that a weld connection is effected when the pieces are brought together. Substantially only the surfaces to be united are thus heated, to the end that a good clean weld is made leaving no excess or flash metal which may come loose and enter the bearing. Thus when the weld is made no further attention need be given to the work piece. This is important because if any excess metal gets into the bearing its life is shortened.

A ring or plate 8 may next be located and it may have a sliding fit with the ring 6 so that it may be pushed into position to abut the race 1. This constitutes the inner retainer for a mass of sealing material 9 which may be an absorbent mass of material such as felt or the like. Another element may be in the form of a ring of L-shape in cross section having one leg 10 which has a sliding fit with the ring 6 and an outer leg 11 which may extend inwardly toward the inner race. The ring 8 and the portion 11 preferably have a running clearance with the inner race.

To hold the structure assembled, the ring 6 may have openings or notches 12 for the reception of the locking ends 13 of spring arms 14 mounted within and united to the portion 10 of the outer ring as by means of welding as shown at 15. When the member 10 is pushed into the ring 6 the spring arms 14 are flexed and then the out-turned ends 13 snap into the apertures 12. To remove the seal a suitable tool may be used to pass through the apertures 12 and depress the ends 13 so that the seal structure may be shifted axially out of the ring 6.

In Fig. 3 the bearing and seal structure are substantially the same as that shown in Fig. 1, but instead of the snap-on arrangement a more permanent connection is made. In this structure the ring 6a has its outer end 16 fashioned over the outer retaining ring for the seal. This may be done by suitable forming or spinning. This eliminates the use of the spring holding structure and makes for a more permanent mounting. The parts in Fig. 3 are otherwise the same as those shown in Fig. 1 and the same reference characters are applied thereto. Also in this view an arrangement is shown which constitutes an extension of the inner race. This extension resides in a piece 17 united to the end of the inner race by welding as at 18, and the extension forms a supporting and operating surface for the seal. The metal of the bearing race is, of course, a high grade and relatively expensive material, and this arrangement shown in Fig. 3 makes use of a lower cost metal for merely forming the extension for cooperation with the bearing seal as distinguished from an integral arrangement shown in Fig. 1.

We claim:

1. In an antifriction bearing having outer and inner races with antifriction elements therebetween, a ring disposed concentrically with the outer race and having one edge thereof weld united to the outer race, a body of sealing material for contact with the inner race, a retainer for the body of material and fitting within the ring, and releasable locking elements interengaging the retainer and ring for holding the retainer within the ring.

2. In an antifriction bearing having outer and inner races with antifriction elements therebetween, a ring disposed concentrically with the outer race and having one edge thereof weld united to the outer race, a body of sealing material for contact with the inner race, a retainer for the body of material and disposed within the ring, and the metal at the free end of the ring being fashioned over the retainer.

3. An antifriction bearing comprising, an outer race having one end face thereof of substantially flat formation, an inner race having an axial dimension exceeding that of the outer race and arranged to project axially from the said end face of the outer race, antifriction elements between the races, a ring disposed concentrically with the outer race and having one edge abutted against and weld united with the said flat face of the outer race, said ring having an axial extent so as to overlie the projecting portion of the inner race, means providing a circumferential inwardly opening channel which constitutes a retainer, said channel having its bight portion fitting within said ring and having the legs of the channel extending radially inwardly toward the inner race and having a running clearance therewith, a body of sealing material confined within the channel and frictionally engaging the extending portion of the inner race, and means for securing the retainer to the ring.

RAYMOND WALTER NILES.
ALBERT HERMAN BETHKE.
WALTER GRAVES.